United States Patent [19]
Kimata et al.

[11] 3,910,642
[45] Oct. 7, 1975

[54] BRAKE FOR AUTOMOBILES PROVIDED WITH ELECTROMAGNETIC CUT-OFF VALVES

[75] Inventors: Osamu Kimata, Susono; Hitoshi Furuya, Mishima, both of Japan

[73] Assignee: Toyota Jidosha Kogyo Kabushiki Kaisha, Japan

[22] Filed: June 27, 1974

[21] Appl. No.: 483,524

[30] Foreign Application Priority Data
Sept. 28, 1973 Japan.............................. 48-108554

[52] U.S. Cl................................. 303/84 A; 60/535
[51] Int. Cl.².......................................... B60T 17/18
[58] Field of Search...... 188/345; 200/82 D; 60/535; 303/84 A, 84 D; 340/52 C, 52 F

[56] References Cited
UNITED STATES PATENTS

| | | | |
|---|---|---|---|
| 2,650,863 | 9/1953 | Fore.................................. | 303/84 A |
| 2,879,791 | 3/1959 | Hollmann..................... | 303/84 A X |
| 3,529,288 | 9/1970 | Dobrikin.................... | 303/84 A UX |
| 3,704,045 | 11/1972 | Walsh.......................... | 303/84 A X |

Primary Examiner—Duane A. Reger
Attorney, Agent, or Firm—Kenyon & Kenyon

[57] ABSTRACT

A vehicle braking apparatus of the type having more than one independent hydraulic system, each including a separate hydraulic line connecting a wheel cylinder to a master cylinder. Each independent system includes a power operated shutoff valve between the master cylinder and wheel cylinder and means for detecting the hydraulic pressure in that system. A switch operable when the brakes are applied closes, in response to sensing by the detecting means of a pressure in any one of the systems that is lower than a predetermined pressure, to connect the shutoff valve for that system to a power source. A separate normally open switch in circuit with the first switch and the power source prevents closing of the shutoff valves unless the brake pedal is depressed to the brake actuating point. A solenoid latching circuit holds the shutoff valve closed, once it has been energized.

13 Claims, 2 Drawing Figures

BRAKE FOR AUTOMOBILES PROVIDED WITH ELECTROMAGNETIC CUT-OFF VALVES

DESCRIPTION OF THE INVENTION

The present invention relates to a brake and particularly, relates to a brake for automobiles provided with electromagnetic cut-off valves.

In the past, a mechanical brake or a hydraulic brake were the most common kind of brakes for automobiles. However, in recent years the majority of automobiles have been equipped with the hydraulic kind.

The hydraulic brake includes a master cylinder provided with a piston and a reservoir tank. A rod for moving the piston projects from one side of the master cylinder and a brake tube for transferring the hydraulic pressure of working fluid in the cylinder of the master cylinder to the wheel cylinder for operating the brake mechanism of each wheel, is connected to the other side of the master cylinder. The rod is connected to a brake pedal which is disposed in the driver's space; therefore, when the brake pedal is depressed, the piston can be moved in the master cylinder. Further, a port is formed on the upper wall of the cylinder of the master cylinder and is connected to the reservoir tank which is filled with the working fluid. When the piston moves to the position where the brake pedal is depressed, the port opening is cut-off from the cylinder. While, when the piston moves to the position where the brake pedal is not depressed, the port is communicated with the cylinder. Consequently, when the brade pedal is depressed, the depression of the brake pedal causes the movement of the piston via the rod and thus, the working fluid in the cylinder is compressed and its hydraulic pressure is increased. The increased hydraulic pressure is transferred to the wheel cylinders mounted on each wheel via the brake tubes and then, if the brake mechanism is for example, of a drum type, the brake-shoe expands towards the inside of the brake drum which is rotatable together with the wheel owing to operation of the wheel cylinder, thereby braking the automobile.

When the brake pedal is released after the braking operation, the piston in the master cylinder is returned to the initial position by means of, for example, a spring. At this time, if the amount of working fluid in the cylinder is reduced compared with the amount of working fluid prior to the braking operation, working fluid is supplied to the cylinder from the reservoir tank via the port. Consequently, the cylinder can usually be filled with the working fluid.

However, the adoption of the aforementioned, so-called single master cylinder involves a certain danger in that when the brake tube bursts or leakage of the working fluid from the single master cylinder or the wheel cylinder occurs, hydraulic pressure of the working fluid is greatly decreased and thus, normal hydraulic pressure for carrying out the braking operation cannot be transferred to all of the wheel cylinders mounted on all of the wheels and braking becomes impossible.

Thus, the so-called tandem-type brake master cylinder provided with a two brake system is often employed at the present time. The tandem master cylinder includes two pistons in series with a spring therebetween and a reservoir tank and a brake tube are provided for each of the two pistons as in the case of the aforementioned single master cylinder. The depression of the brake pedal is transferred to a first piston via the rod, causing movement of the first piston which in turn, creates hydraulic pressure and causes movement of a second piston. As a result, when the hydraulic pressure created by the first piston is transferred to a first brake tube and becomes equal to the hydraulic pressure which is created by the second piston and transferred to a second brake tube, movement of both the first and second pistons halt.

In a conventional master cylinder, for example, the first brake tube is connected to the front wheels of an automobile and the second brake tube is connected to the rear wheels. Consequently, even if either of the first or second brake systems malfunctions and hydraulic pressure of the working fluid contained therein decreases, the remaining intact brake system is still operable.

However, in the case of malfunctioning in either of the brake systems, when the brake pedal is depressed, if the hydraulic pressure of the working fluid contained in the first brake system is decreased, the first piston is considerably displaced while if hydraulic pressure of the working fluid contained in the second brake system is decreased, the second piston is considerably displaced. This results in a leakage of fluid contained in the cylinder, from the source of the malfunction. Therefore in such an abnormal braking operation working fluid is wasted, and since the piston in the malfunctioning brake system is considerably displaced, the extent of the depression of the brake pedal must be considerably increased compared with the extent of the depression in a normal braking operation, and thus, even if the brake pedal is depressed as far as possible, sufficient hydraulic pressure cannot be transferred to the remaining intact brake system which is still in order. This is quite disadvantageous. In order to avoid this disadvantage, a master cylinder with a relatively large inner diameter is usually adopted. Because of this, it is true that if the hydraulic pressure of the working fluid contained in the malfunctioning brake system is decreased, the displacement of the piston in the malfunctioning system can be made small. Therefore, it is also true that the remaining intact brake system can be operated independently of a normal or abnormal braking condition by providing a depression less than the full depression of the brake pedal to the brake pedal.

However, the adoption of such a tandem master cylinder with a relatively large inner diameter causes an increase in the hydraulic pressure of the working fluid contained in the brake system when the brake pedal is depressed that is less than the pressure which is created by use of a master cylinder having relatively small diameter. Hence, the disadvantage of the tandem master cylinder with a large inner diameter is made apparent by an insufficient braking force.

An object of the present invention is to provide a brake such that even if either of the brake systems fails to operate, the extent of depression of the brake pedal can be at a level nearly the same as that in a normal operational condition and thus, sufficient braking force can be obtained. In this invention the tandem master cylinder is connected to each wheel cylinder via electromagnetic cut-off valves and occurrence of trouble in the brake system is detected by hydraulic pressure switches, whereby the electromagnetic cut-off valve disposed in the defective brake system is operated, interrupting the hydraulic connection between the cylinder and the wheel cylinders and thus preventing the outflow of the working fluid from the cylinder.

According to the present invention, a brake comprises: a first hydraulic pressure detecting means mounted on the tandem master cylinder for detecting a decrease in pressure in the first cylinder from a predetermined value, a second hydraulic pressure detecting means mounted on the tandem master cylinder for detecting a decrease in pressure in the second cylinder from a predetermined value, a first means provided between the first cylinder and the first wheel cylinders for interrupting hydraulic connection therebetween and operated by said first hydraulic pressure detecting means in response to detection of the decrease in pressure in the first cylinder and, a second means provided between the second cylinder and the second wheel cylinders for interrupting hydraulic connection therebetween and operated by said second hydraulic pressure detecting means in response to detection of the decrease in pressure in the second cylinder. A switching means is provided between a power source and said first and second means operable so that if said first hydraulic pressure detecting means detects a decrease in pressure in the first cylinder from a predetermined value, power is applied to said first means from the power source for operation thereof, and if said second hydraulic pressure detecting means detects a decrease in pressure in the second cylinder from a predetermined value, power is applied to said second means from the power source for operation thereof.

This and other objects of the invention may be more fully understood from the following description of a preferred embodiment of the invention, with reference to the accompanying drawings.

BRIEF DESCRIPTIONS OF THE DRAWINGS

DESCRIPTION OF A PREFERRED EMBODIMENT

Figure 1:
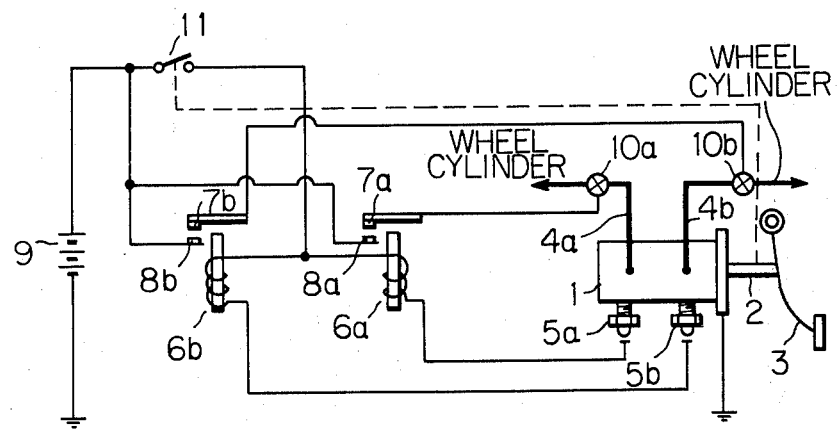
FIG. 1 is a schematic diagram of a hydraulic circuit and an electric circuit according to the present invention.

Referring to FIG. 1, a tandem-type brake master cylinder 1 is provided with a rod 2 for reciprocally moving pistons mounted in the tandem master cylinder 1. The rod 2 projects from the right end of the tandem master cylinder 1 and connects to a brake pedal 3 preferably at the right end of the rod 2.

Thus, when the brake pedal 3 is depressed, the rod 2 is correspondingly moved and this movement, in turn, causes movement of the pistons in the tandem master cylinder 1. The tandem master cylinder 1 is provided with two brake tubes, one of which is the first brake tube 4a for transferring the hydraulic pressure in the first cylinder of the tandem master cylinder 1 created by movement of the first piston, to the first hydraulic system, for example, the wheel cylinders disposed in the front wheels. The other is the second brake tube 4b for transferring the hydraulic pressure in the second cylinder of the tandem master cylinder 1 created by movement of the second piston, to the second hydraulic system, for example, the wheel cylinders disposed in the rear wheels. Further, the tandem master cylinder 1 is provided with a first hydraulic pressure switch 5a for detecting hydraulic pressure in the first cylinder and a second hydraulic pressure switch 5b for detecting hydraulic pressure in the second cylinder. These hydraulic pressure switches 5a and 5b operate in a manner that when the brake pedal 3 is depressed, if the hydraulic pressure of the working fluid in the first or second cylinders is lower than the predetermined normal pressure, these switches turn ON.

The elements designated by references 6a, 7a and 8a and references 6b, 7b and 8b form electric relays, in which when a solenoid 6a is energized, a contact 7a comes into contact with a contact 8a and when a solenoid 6b is energized, a contact 7b comes into contact with a contact 8b. The contacts 7a and 7b are respectively electrically connected to an electromagnetic cut-off valve 10a disposed on the brake tube 4a and an electromagnetic cut-off valve 10b disposed on the brake tube 4b. A switch 11 is associated with the brake pedal 3 in such a manner that when the brake pedal 3 is depressed by an amount of more than 40 – 50% of the full depression potential of the brake pedal 3, the switch 11 turns ON and when this happens, both hydraulic pressure switches 5a and 5b are electrically connected to a power-source 9. At this time, if the brake system is in normal operational condition, during depression of the brake pedal it is necessary that relationship between the switch 11 and the hydraulic pressure switch 5a or 5b be regulated such that the switch 11 turns ON after hydraulic pressure switch 5a or 5b turns OFF. The reason for this is to avoid causing an error in the operation of the electromagnetic cut-off valve 10a or 10b whch can occur when the pressure of the working fluid in the cylinder is not created, that is, the brake pedal 3 is not depressed, both hydraulic pressure switches 5a and 5b are in an ON condition. In this situation, when brake pedal 3 is depressed to a small extent, the electromagnetic cut-off valve 10a or 10b is put into operation.

When the brake pedal 3 is depressed, the hydraulic pressure in each cylinder of the tandem master cylinder 1 usually attains pressure higher than the predetermined normal pressure, thus both hydraulic pressure switches 5a and 5b are in the OFF position, and solenoids 6a and 6b are not energized.

However, if either the first or second brake system is out of order, when the brake pedal 3 is depressed, hydraulic pressure in the cylinder connected to either of the brake systems cannot attain pressure higher than the predetermined normal pressure and whichever hydraulic pressure switch (5a or 5b) is connected to the malfunctioning brake system turns ON.

At this time, as the switch 11 has already been turned ON, electric current passes through from the power source 9 to whichever hydraulic pressure switch (5a or 5b) is connected to the malfunctioning brake system via the solenoid 6a or 6b. Thus, the solenoid 6a or 6b is energized, whereby either the contact 7a and 8a or the contact 7b and 8b is closed. This results in electric current being applied to either of electromagnetic cut-off valves 10a or 10b, thereby operating one or the other and interrupting the outflow of the working fluid contained in either brake tube 4a or 4b.

Figure 2:
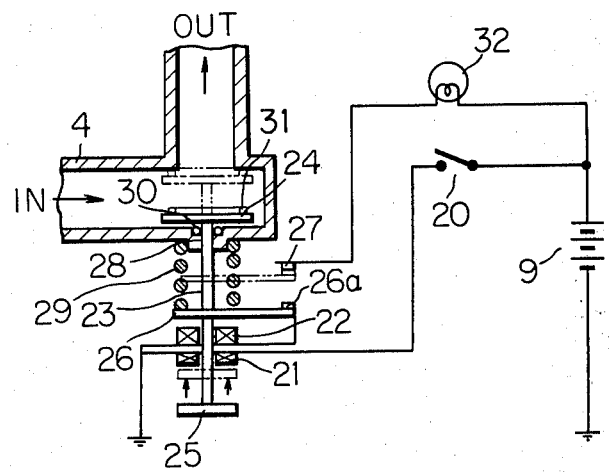
FIG. 2 is a cross sectional view of an electromagnetic cut-off valve according to the present invention and a schematic diagram of an electric circuit of the electromagnetic cut-off valve.

FIG. 2 shows a preferable embodiment of the electromagnetic cut-off valve, which corresponds to the electromagnetic cut-off valve 10a or 10b shown in FIG. 1, and switch 20 shown in FIG. 2 corresponds to a switch element comprising contact points 7a and 8a or a switch element comprising contact points 7b and 8b as shown in FIG. 1. Therefore, the contact of the contact points 7a or 7b with the contact points 8a or 8b in FIG. 1 corresponds to the switch 20 turning ON in FIG. 2.

The valve housing 4 is formed in a L-shape, and when the brake pedal 3 (shown in FIG. 1) is depressed, the working fluid flows along an L-shaped passage in the direction indicated by the arrows. The L-shaped passage is connected to both the cylinder and the wheel cylinder. A round hole 28 is formed on the under surface on the valve housing 4 and a rod 23 is sldable inserted into the round hole 28, whereby the rod 23 can move up and down in this hole 28. A valve 24 and a disk 25 are rigidly fixed to both ends of the rod 23 and a spring support plate 26 is also rigidly fixed to the center of the rod 23. A pair of solenoids 21 and 22 are disposed around the rod 23 between the spring support plate 26 and the disk 25. A coil spring 29 is disposed between the under surface of the valve housing 4 and the spring support plate 26 and this coil spring 29 usually presses the rod 23 downwards by means of the spring support plate 26. An O-ring 30 and a seal 31 for preventing leakage of the working fluid, are mounted on the inside of the valve housing 4 and on the valve 24, respectively. The outer surface of the O-ring 30 is fitted to the recess formed on the bottom wall of the valve housing 4 and the inner surface of said O-ring 30 is in contact with the rod 23, thereby preventing the working fluid from leaking through the round hole 28. The seal 31 is rigidly fixed to the upper surface of the valve 24 and when the valve 24 is displaced upward to the position indicated by the broken line, the valve 24 abuts against the inner wall which defines a valve port near the center thereof, thereby closing the valve port and interrupting the flow of the working fluid.

The spring support plate 26 is provided with a contact point 26a at its right end portion and the contact point 26a is electrically connected to the solenoid 22. A stationary contact point 27 is disposed above the contact point 26a, whereby when the rod 23 is displaced upward, the contact point 26a comes into contact with the stationary contact point 27. When this contact occurs, an electric current is applied to the solenoid 22 from the power source 9 via a warning lamp 32. The rod 23 usually rests in its lowermost position by the spring force of the coil spring 29 as indicated by the solid line in FIG. 2.

If, when the brake pedal 3 (shown in FIG. 1) is depressed, either of the brake systems is out of order, the switch 20 turns ON and simultaneously, the solenoid 21 is energized, whereby the disk 25 is attracted towards the solenoid 21, thus displacing disk 25 upward to the position indicated by the broken line overcoming the force of the coil springs 29. When the disk 25 is displaced upward, the rod 23 is simultaneously displaced upward, displacing with it, the valve 24 and the spring support plate 26 which are fixed to the rod 23, to the position indicated by the broken line. The valve 24 therefore abuts against the inner wall of the valve housing 4, thereby interrupting the flow of working fluid, and simultaneously, the stationary contact point 27 comes into contact with the contact point 26a. This results in solenoid 22 being energized and the warning lamp 32 being illuminated.

When the brake pedal 3 is released, the switch 11 (shown in FIG. 1) turns OFF and the solenoid 21 is deenerized. However, as the solenoid 22 continues to be energized independent on the ON, OFF operations of the switch 20, the disk 25 continues to be attached by the solenoid 22 and continues to be held at the position indicated by the broken line. Consequently, the flow of working fluid continues to be interrupted by the valve 24 and the warning lamp 32 continues to be illuminated.

It can be understood therefore, that if the brake pedal 3 is depressed and either the first or second brake system is out of order, the piston which is mounted in the tandem master cylinder 1 and compresses the working fluid contained in the affected brake system can be displaced to nearly the same extent, as when the brake system is in a normal operating condition, since the afrementioned malfunction is immediately detected by the hydraulic pressure switch and the flow of the working fluid contained in the affected brake system is immediately interrupted by the electromagnetic cut-off valves 10a or 10b.

According to the present invention, it is apparent that the following various effects are advantageously provided.

i. Even if either of the brake systems fails to operate, the extent of depression of the brake pedal can at a level nearly the same as that in a normal operational condition. It is not necessary to employ a conventional tandem master cylinder having a relatively large cylinder bores since a tandem master cylinder having relatively small cylinder bores can be employed, whereby sufficient braking force can be obtained.

ii. A decrease in the amount of working fluid can be avoided, since outflow of the working fluid from the cylinder which is connected to the malfunctioning brake system is interrupted by the electromagnetic cut-off valve.

iii. A driver can immediately recognize when a brake is defective, since the warning lamp becomes illuminated at the moment either of the brake systems begins malfunctioning.

What is claimed is:

1. A brake adapted for use in automobiles in which a first and a second brake system having a first and a second wheel cylinder are provided by employing a tandem-type brake master cylinder having a first and a second cylinder, comprising:

a first hydraulic pressure detecting means mounted on the tandem master cylinder for detecting decrease in pressure in the first cylinder, from a predetermined value;

a second hydraulic pressure detecting means mounted on the tandem master cylinder for detecting decrease in pressure in the second cylinder, from a predetermined value;

a first means provided between the first cylinder and the first wheel cylinder for interrupting hydraulic connection therebetween and operated by said first hydraulic pressure detecting means in response to detection of the decrease in pressure in the first cylinder;

a second means provided between the second cylinder and the second wheel cylinder for interrupting hydraulic connection therebetween and operated by said second hydraulic pressure detecting means in response to detection of the decrease in pressure in the second cylinder;

a power source; and a switching means provided between the power source and said first and second means and responsive to said first and second pressure detecting means so that when said first hydraulic pressure detecting means detects a decrease in pressure in the first cylinder from a predetermined value, power is applied to said first means from the power source for operation thereof, while when said second hydraulic pressure detecting means detects a decrease in pressure in the second cylinder from a predetermined value, power is applied to said second means from the power source for operation thereof.

2. A brake as recited in claim 1, wherein said first and second hydraulic pressure detecting means respectively comprise first and second hydraulic pressure switches which turn ON when hydraulic pressure in the first or second cylinder is lower than a predetermined hydraulic pressure.

3. A brake as recited in claim 2, wherein said switching means comprises a first and a second contact point assembly, the first contact point assembly having a pair of normally open contact points in which one is connected to the power source and the other is connected to said first means, the second contact point assembly having a pair of normally open contact points in which one is connected to the power source and the other is connected to said second means, and two solenoids operable to close said two pairs of contact points, respectively, upon energization, each said solenoid being on one hand connected to one of said first and second hydraulic pressure switches and being on the other hand connected to the power source via a switch associated with a brake pedal.

4. A brake as recited in claim 1, wherein each of said first and second means comprises an electromagnetic cut-off valve which comprises: a valve housing having a valve port; a valve movable in said valve housing towards said port from a position remote from said port; a rod, one end of which being fixed to said valve and the other end of which extending outside of said valve housing; a spring means for maintaining said usual position remote from said port; and solenoid means for actuating said valve toward said port via said rod.

5. A brake as recited in claim 4, in which said spring means is a compression coil spring and said solenoid means comprises two adjacent solenoids close to said other end of said rod for cooperating to actuate the movement of said valve toward said port via said rod, wherein said electromagnetic cut-off valve further comprises: a disk fixed to said other end of the rod; a spring support plate fixed on the center of said rod for supporting said compression coil spring between said valve housing and said spring support plate; a pair of normally open contact points in which one is mounted on said spring support plate and the other is disposed opposite to said contact points mounted on said spring support plate, said pair of contact points being closed when said valve is moved toward said port; one of said solenoids is connected to the power source for energizing said solenoid via said switching means so that when said switching means is operated, said disk is attracted by said solenoid, overcoming the spring force of said compression coil spring thereby actuating said valve toward said port, while the other of said solenoids is connected to the power source for energizing said other solenoid via said pair of contact points so that when said pair of contact points are closed, said disk is maintained in an attracted state by said other of solenoids thereby maintaining the closing-off of said port.

6. A brake as recited in claim 5, wherein a warning lamp is provided for informing a driver of a malfunctioning brake, said warning lamp being illuminated when said pair of contact points is closed.

7. An improved vehicle brake apparatus of the type having a plurality of independent hydraulic systems, each system including a master cylinder, a wheel cylinder, and a hydraulic line connecting the master cylinder to the wheel cylinder, wherein the improvement comprises:
pressure sensing means for detecting the pressure in each hydrualic system;
power operated valve means for interrupting the hydraulic connection between the respective master cylinder and wheel cylinder; and
switching means operable upon acutation of the brake apparatus and responsive to detection by said pressure sensing means of a pressure in any one of the hydraulic systems less than a predetermined pressure to connect the valve means of said system to a power source for shutting off the respective wheel cylinder from the master cylinder.

8. A brake apparatus according to claim 7 further comprising latching means responsive to the energization of each valve by said switching means for maintaining connection of said valve to a power source when the connection through the switching means is interrupted, whereby the power valve means will remain closed when the pressure in the master cylinder subsequently rises to said predetermined value.

9. A brake apparatus according to claim 8 wherein the latching means comprises a solenoid connected in circuit with said switching means and having a holding coil with one end connected to one side of an electric power source;
a pair of normally open contacts, one of said contacts being connected to the other end of the coil and the other contact being connected to the other side of the power source; and
actuating means responsive to energization of said solenoid by said switch means for closing said pair of contacts to maintain the energization of said solenoid.

10. A brake apparatus according to claim 9 further comprising a warning indicator connected in circuit with the pair of contacts and the power source for providing an indication of system malfunction when the holding coil is energized.

11. A brake apparatus according to claim 9 wherein the actuating means responsive to energization of the solenoid is operatively connected to the valve means for shutting the valve means when the solenoid is energized.

12. A brake apparatus according to claim 7 further comprising means for preventing connection of any of the valve means to a power source unless the brake apparatus is being actuated.

13. A brake apparatus according to claim 12 further including a brake pedal for actuating the master cylinder of each system, wherein the means for preventing connection of any valve means to a power source comprises a normally open switch connected in series with the switching means and all the valve means, said switch being closed upon movement of the brake pedal to a position within its normal brake actuating range.

* * * * *